April 27, 1954 — G. B. HILL — 2,676,532
BALING PRESS
Filed Nov. 26, 1951 — 2 Sheets-Sheet 1

INVENTOR
G. B. HILL
BY
ATTORNEYS

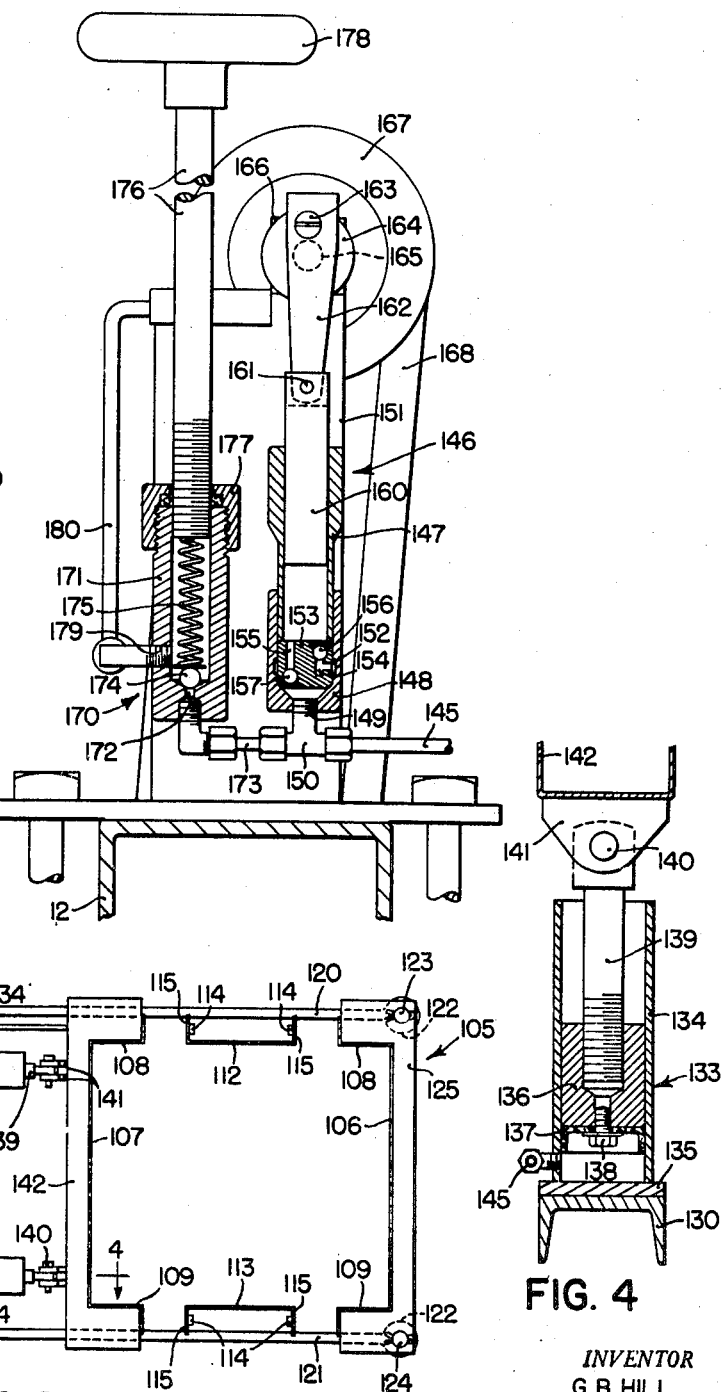

Patented Apr. 27, 1954

2,676,532

UNITED STATES PATENT OFFICE 2,676,532

BALING PRESS

George B. Hill, Celina, Ohio, assignor to Deere Manufacturing Co., Dubuque, Iowa, a corporation of Iowa Original application October 12, 1946, Serial No. 702,908, now Patent No. 2,608,153, dated August 26, 1952. Divided and this application November 26, 1951, Serial No. 258,177

1 Claim. (Cl. 100—192)

The present invention relates generally to baling presses and more particularly to mechanism for applying pressure to the opposing walls of the bale case to provide a resistance to the movement of the bales of crops therethrough, and thus to determine the density to which the bales are packed during the baling operation.

This application is a division of co-pending application Serial No. 702,908, filed October 12, 1946, now Patent No. 2,608,153, dated August 26, 1952.

The principal object of the present invention relates to the provision of novel and improved means for applying pressure to the opposing walls of the bale case, which is more satisfactory in operation under varying crop conditions and which provides bales of greater uniformity, but without a proportionate increase in complexity and cost.

In tractor drawn baling presses of the type in which the bale case is disposed transversely of the direction of travel of the implement, as disclosed in United States Patent No. 2,484,890, the length of the bale case is necessarily appreciably shorter than the more conventional type of bale case which is disposed longitudinally of the direction of travel. Inasmuch as the frictional resistance to movement of the bales through the case is inherently less in the shorter cases, it is necessary to provide mechanical means for increasing frictional resistance in order to produce bales of satisfactory density, since the pressure at which the crop is packed into the bales is dependent upon the frictional resistance of the bale case to movement of the bales through the baling chamber. This additional friction is provided by an adjustable bale case extension, comprising a pair of opposing walls which are pivotally mounted on the bale case at the discharge end thereof by means which provides for movement of the opposing walls toward and away from each other, and means for urging the walls toward each other to compress the bales.

Still another object relates to the provision of force exerting mechanism for urging the opposing walls of the bale case extension toward each other with a force which is substantially constant regardless of variations in the distance between the opposing walls. This is desirable to accommodate unevenness in the sides of the bales of hay or other crops in order to provide a substantially constant frictional resistance to movement thereof. It is also desirable that the opposing walls do not move apart to positions in which they inflexibly resist any further movement, for when the walls reach such inflexible positions, the bale case can become jammed until the baling pressure exceeds a reasonable limit.

In order to equalize the pressure along the opposing walls by providing at least two spaced pressure transmitting connections through which force is exerted to urge the opposing walls toward each other, it is also conventional to provide means for adjusting the amount of pressure applied by the force transmitting means to the sides of the hay bales. It is a further object of the invention to provide a single control device for adjusting the pressure transmitting devices simultaneously and to equal extent, in order that the amount of pressure exerted along the sides of the bale is maintained substantially uniformly.

A still further object relates to the provision of control mechanism for simultaneously controlling the pressure exerting devices of a baling press of the tractor operated, automatic, one-man-controlled type, the control mechanism extending to a position on the baling press within reach of the operator from his station on the tractor. It is well known to those skilled in the art that the frictional resistance of the hay bales in the baling chamber varies widely with the crop conditions and especially with the amount of moisture in the baled crops. For example, when the baling work is begun in the morning, the hay is frequently damp enough to have a substantial moisture content, and therefore in order to prevent packing the hay too tightly in the bales it is necessary to loosen the pressure exerting devices at the discharge end of the bale case. Later, as the hay dries out, the frictional resistance of the hay bales against the bale case decreases, and if no adjustment were made the bales would be packed too loosely. Thus, by providing control means convenient to the operator of the tractor, the pressure upon the bales can be gradually adjusted from time to time, without the necessity for the operator to stop the tractor and walk back to make adjustment of the pressure exerting mechanism on the bale case, resulting in an appreciable increase in efficiency of operation. Furthermore, there will be less variation in the weight of the bales, for the ease of adjusting the bale case pressure will encourage the operator to make frequent adjustments as moisture and other crop conditions change during the day.

These and other objects and advantages of the present invention will be apparent to those skilled in the art after a consideration of the following description, in which reference is had to the drawings appended hereto, in which Figure 1 is a fragmentary top plan view of a tractor operated baler, showing a preferred embodiment of the invention;

Figure 2 is an end elevational view of the bale case and hydraulic pressure exerting mechanism;

Figure 3 is an elevational view, partly in section, and drawn to an enlarged scale, showing certain details of the hydraulic mechanism; and Figure 4 is a sectional view taken through one of the hydraulic pressure exerting mechanisms, as viewed along a line 4—4 in Figure 2.

Figure 1:
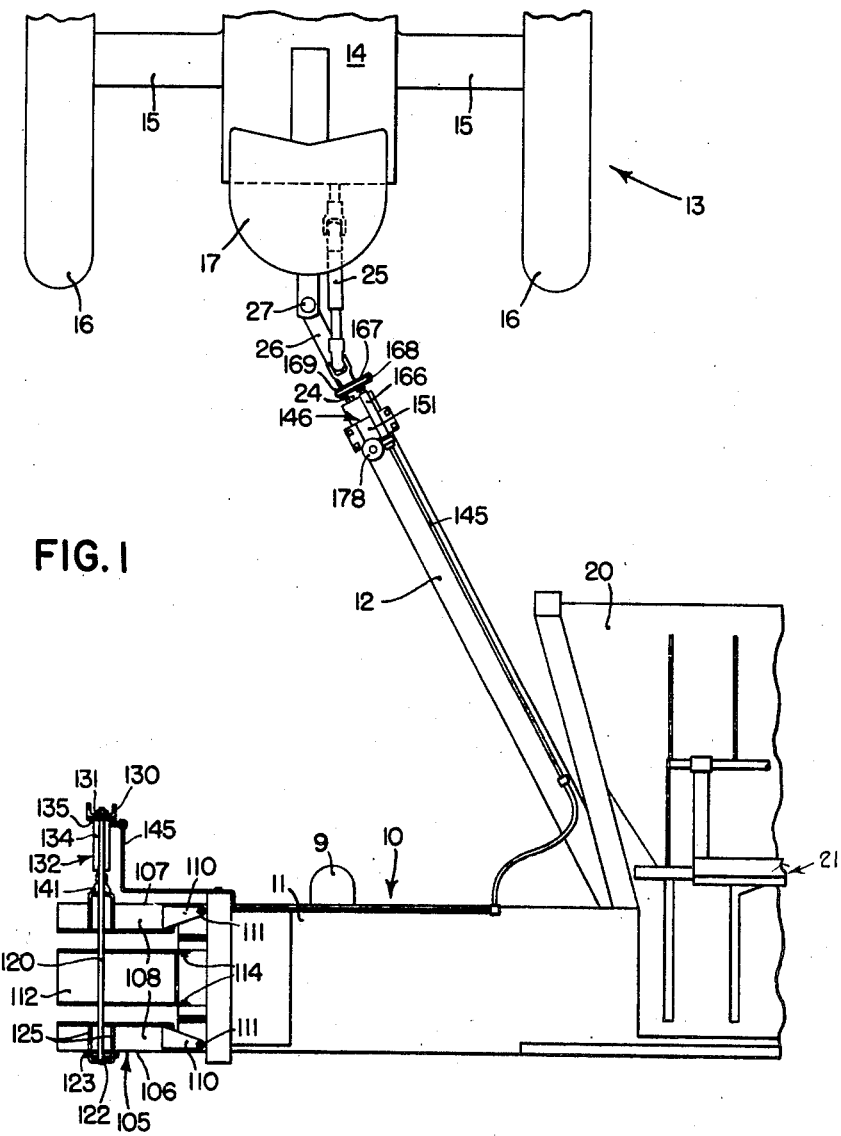

The baling press is indicated in its entirety by reference numeral 10 and is of the general type disclosed in the above mentioned Hill patent. The press 10 comprises a transverse bale case 11 carried on wheels 9 and is provided with a forwardly and laterally inclined draft member 12, which extends to a draft connection on the rear end of a tractor 13. The tractor 13 comprises a body 14 carried on axle housings 15 and rear traction wheels 16. The rear end portion of the body 14 has an operator's station 17.

The baling press 10 has a forwardly extending harvester platform 20 mounted on the front of the bale case 11 and spaced laterally from the plane of the adjacent tractor wheel 16, and may have conventional mechanism (not shown) for picking up a crop windrow and delivering it rearwardly into a feeder mechanism 21 which feeds the crops into the baling chamber, in which a plunger (not shown) is reciprocated by any suitable drive mechanism deriving power from a conventional flexible power shaft connection 25 to the power take-off shaft of the tractor. The draft member 12 is connected by a tongue 26 to a pivot connection 27 on the rear of the tractor body 14.

The details of the tractor and baling press are not fully shown and described herein since they form no essential part of the present invention. It will be understood that in this preferred embodiment, the baling press is provided with any suitable automatic tying mechanism, such as that disclosed in the above mentioned Hill patent.

During the baling operation, the crops are packed in the bale case 11 by the plunger in a manner well known to those skilled in the art, forcing the crops laterally through the bale case, and after the bales are tied they are discharged laterally outwardly through a bale case extension 105 at the left-hand end of the bale case, from which the completed bales drop to the ground.

The bale case extension 105 comprises a pair of laterally spaced opposed walls 106, 107, each of which is provided with inwardly turned upper and lower flange portions 108, 109, respectively. The walls 106, 107 lie in vertical planes and serve as extensions of the side walls of the bale case 11, respectively, while the flange portions 108, 109 lie substantially in the planes of the top and bottom walls of the bale case, respectively. Each of the wall members 106, 107 is provided with a pair of upper and lower mounting brackets 110, which are fixed to the flange portions 108, 109 and are pivotally connected by pivot bolts 111 to the top and bottom walls of the bale case 11, providing for generally horizontal swinging movement about the vertical axes of the upper and lower aligned pivot bolts 111, thus providing for horizontal swinging movement of the walls 106, 107 toward and away from each other. A pair of top and bottom wall elements 112, 113 extend longitudinally of the bale case substantially in the planes of the top and bottom walls of the latter, respectively, and are pivotally mounted by means of bolts 114 on the bale case 11, providing for vertical swinging movement about horizontal axes. The bolts 114 extend through vertical flange portions 115 on the walls 112, 113 and into end portions 116 of the bale case. A bale case extension of this type is disclosed and claimed in United States Patent No. 2,458,994.

A pair of tension rods 120, 121 lie transversely above and below the bale case extension 105 and have eye portions 122 pivotally mounted on one of the wall members 106 by means of pivot pins 123, 124, respectively. These pins extend through a pair of spaced bracket flanges 125 fixed, as by welding, to the outer side of the wall 106 and horizontal flanges 108, 109. The rods are connected to a vertical channel shaped yoke member 130 spaced outwardly from the opposite side wall 107, the rods being threaded to receive nuts 131.

Upper and lower hydraulic rams 132, 133 are disposed between the yoke member 130 and the wall member 107 and are extensible to urge the two side walls 106, 107 toward each other. Each of the ram units comprises a cylinder 134 having a head 135 mounted on the vertical yoke 130. A piston 136 is slidable within the cylinder 134 and is provided with a flexible annular sealing member 137 secured in place by a bolt 138. The piston is connected to a piston rod 139 which extends outwardly through the open end of the cylinder 134 and which is connected by a pivot pin 140 to a pair of vertically spaced lugs 141 welded to a vertical channel member 142 that is rigidly attached to the side wall 107.

A fluid supply duct 145 extends between the two cylinders 134 and is connected in communication with each of the latter between the piston 136 and cylinder head 135 to supply fluid under pressure to the pressure chambers of the rams 132, 133, and the duct 145 extends to a source of fluid pressure in the form of a pump 146 mounted on the draft member 12 adjacent the forward end thereof. Thus, the rams 132, 133 are connected to a common pressure conduit 145 which insures that the pressure is applied equally through both rams to the upper and lower portions of the opposing side walls 106, 107. When pressure is applied to the cylinders 134, the pistons are forced outwardly thereof, thereby to urge the adjacent side wall 107 inwardly, while the reaction is transmitted through the yoke 130 and the tension rods 120, 121 to pull the opposite side wall 106 inwardly toward the wall 107.

The pump unit 146 comprises a pump cylinder 147 having a cap 148 at its lower end serving as a cylinder head and having a discharge outlet 149 in the lower end thereof connected by a suitable T-fitting 150 to the fluid supply duct 145. The cylinder 147 is mounted on a reservoir 151, which is connected in communication with a groove 152 extending annularly around the inner surface of the cap 148. A valve element 153 is mounted within the cap 148 and comprises a block having a passage 154 communicating with the groove 152 and with the inside of the cylinder 147. The block 153 has another passage 155 communicating between the cylinder 147 and the discharge outlet 149. A pair of ball check valves 156, 157 are disposed within the passages 154, 155, respectively. The check valve 156 is adapted to open to permit a flow of fluid from the reservoir through the groove 152 and passage 154 into the cylinder 147 and to prevent reverse flow of fluid therethrough. The other ball check valve 157 is adapted to permit a flow of fluid from the cylinder 147 through the passage 155 and out through the discharge opening 149 and to prevent reverse flow.

Within the cylinder 147 is a pump piston 160, which extends upwardly through the open end of the cylinder 147 and is pivotally connected by a pin 161 to a connecting rod 162, which is journaled on a crank 163 on a disk 164, mounted on a drive shaft 165. The shaft 165 is journaled in a sleeve bearing 166 secured to the top of the reservoir 151. A drive sheave 167 is fixed to the shaft 165 on the opposite end of the latter and is connected through a flexible V-belt 168 to a sheave 169 fixed to the power shaft 24. Rotation of the power shaft 24 drives the pump piston 160 via the reciprocating connecting rod 162, whereby movement of the piston 160 upwardly in the cylinder 147 draws fluid through the passage 154 from the reservoir 151, past the check valve 156 into the cylinder. At this time the other check valve 157 is closed, but when the piston 160 travels downwardly on a pressure stroke, the check valve 156 closes and the fluid is forced downwardly through the passage 155 past the check valve 157 and out through the discharge opening 149 to the duct 145.

A control valve, indicated generally by reference numeral 170, comprises a casing 171 having an inlet opening 172 at its lower end connected by a conduit 173 with the T-shaped fitting 150 and hence with the supply duct 145. A ball valve 174 seats in the intake opening 172, being held in seated position by means of a helical compression spring 175 which is disposed within the casing 171 and which bears against the lower end of a threaded control rod 176. This rod extends upwardly through a cap 177 mounted on the upper end of the casing 171. The upper end of the control rod 176 has a handle 178 by means of which the rod 176 can be rotated. Since the lower end of the rod 176 is threaded within the casing 171 and bears against the upper end of the compression spring 175, rotation of the rod in one direction increases the compressive force in the spring 175 acting against the ball valve 174, and rotation of the rod in the opposite direction reduces the amount of force urging the ball 174 into its seat. The casing 171 is provided with an exhaust opening 179 in the side thereof, which is connected by a return duct 180 to the upper end of the reservoir 151.

During operation, the pump 146 runs constantly, forcing oil under pressure into the supply duct 145, thereby applying pressure to the rams 132, 133. The oil forces the ball valve 174 open against the pressure of the spring 175 and returns through the duct 180 to the reservoir. When the stress in the compression spring 175 is increased, the pressure required to open the valve 174 increases, whereupon the pressure in the duct 145 and ram cylinders 134 is correspondingly increased. This causes a greater pressure to be maintained for urging the two side walls 106, 107 toward each other, thereby providing a greater resistance to movement of bales through the bale extension 105. On the other hand, should the crops be moist and heavy, resulting in excessive pressure within the bale case 11, the resistance to movement of bales through the bale case extension 105 can be decreased by rotating the control rod 176 by means of the handle 178 to reduce the stress in the compression spring 175, thereby reducing the pressure in the pump cylinder 147 and supply duct 145, and therefore in the ram cylinders 134.

The control rod or shaft 176 can be made long enough to extend within reach of the tractor operator so that he may adjust the pressure in the rams 132, 133 without leaving his station on the tractor. It will be understood that inasmuch as the two ram cylinders 134 are connected together in multiple, a single adjustment of the valve spring 175 affects a simultaneously adjustment of the pressure in the two ram cylinders 134.

What is claimed is:

In a baling press having a bale case including a pair of oppositely disposed walls adapted to move toward and away from each other and a hydraulic ram for applying force to said walls for urging said walls toward each other, the improvement comprising means for supplying hydraulic fluid under pressure to the ram including a fluid reservoir, a continuously operating pump connected with the reservoir and having supply duct means connected to the ram, control means for controlling the pressure of fluid supplied to the ram, said control means comprising a valve chamber communicating with the reservoir, a valve seatable on the port, said chamber having a threaded opening spaced from the valve, a threaded rod carried in the threaded opening and extending both interiorly and exteriorly of the chamber, a spring acting in compression against the interior end of the rod and reacting against the valve to bias the valve toward seating on the port, and the exterior of the rod having manually engageable means thereon for turning the rod to vary the compressive force applied by said spring to the valve.

References Cited in the file of this patent
UNITED STATES PATENTS

| Number | Name | Date |
| --- | --- | --- |
| 1,159,948 | Johnson et al. | Nov. 9, 1915 |
| 1,993,195 | Temple | Mar. 5, 1935 |
| 2,196,645 | Saiberlich | Apr. 9, 1940 |
| 2,396,720 | Nolt | Mar. 19, 1946 |